United States Patent [19]

Lee

[11] 4,118,163

[45] Oct. 3, 1978

[54] PLASTIC EXTRUSION AND APPARATUS

[75] Inventor: Soo-Il Lee, Toledo, Ohio

[73] Assignee: Owens-Illinois, Inc., Toledo, Ohio

[21] Appl. No.: 814,524

[22] Filed: Jul. 11, 1977

[51] Int. Cl.² .............................................. B29F 3/06
[52] U.S. Cl. ..................................... 425/146; 366/88;
    366/169; 425/205; 425/208; 425/379 R
[58] Field of Search .......................... 264/176 R, 40.7;
    425/207, 208, 378 R, 209, 379 R, 145, 146, 376
    R, 461, 144, 205; 198/669; 100/146; 366/88, 90,
    169

[56] References Cited

U.S. PATENT DOCUMENTS

| 3,137,035 | 6/1964 | Hendry | 425/376 R X |
| 3,632,256 | 1/1972 | Kasting et al. | 425/208 X |
| 3,712,594 | 1/1973 | Schippers et al. | 425/208 X |

FOREIGN PATENT DOCUMENTS 458,583  3/1928  Fed. Rep. of Germany ............ 425/461

Primary Examiner—Francis S. Husar
Assistant Examiner—Mark Rosenbaum
Attorney, Agent, or Firm—Charles S. Lynch; E. J. Holler

[57] ABSTRACT

Disclosed is a screw extruder apparatus, having passages to drain melt as formed into a central bore of the screw, which is physically separated by seal means into a first zone on the feed side advancing plastic toward said seal and a second zone on the opposite side of said seal means into which drained melt passes from the bore and is pumped back toward said seal and out a lateral exit orifice adjacent said seal means. The temperature of the melt in the second zone can be independently controlled. In one embodiment means are provided to maintain an essentially constant pressure in said second zone.

10 Claims, 2 Drawing Figures

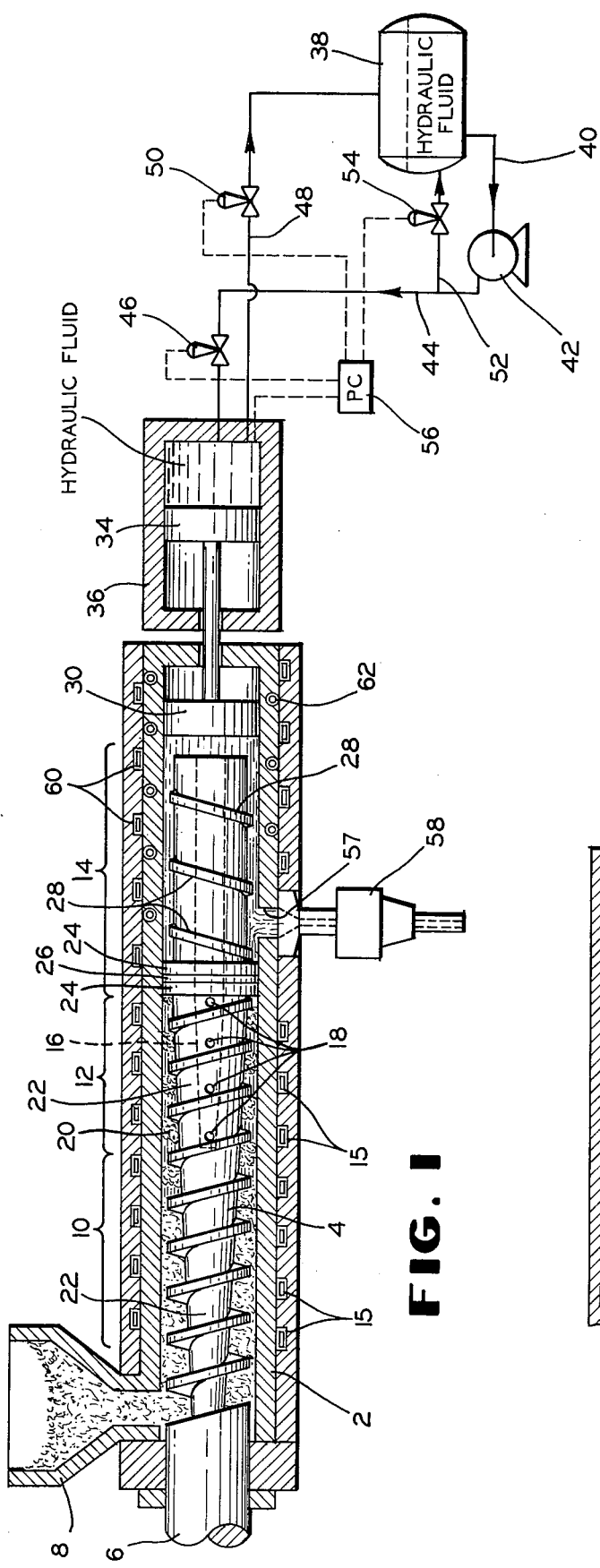
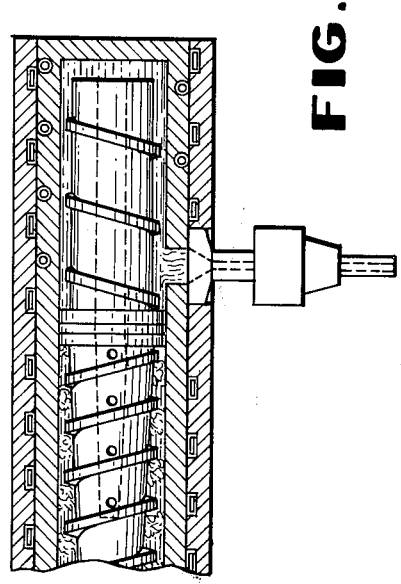
FIG. 1
FIG. 2

PLASTIC EXTRUSION AND APPARATUS

This invention relates to a plasticizing screw extruder apparatus in which a method of plasticizing, melting and delivering plastic to an exit orifice is practiced, incorporating novel apparatus and process features.

The functional zones in conventional plasticizing screw extruders may be divided into three zones for convenience, i.e.; (i) solid conveying and delay zones, (ii) melting and melt pump zone and (iii) melt homogenization and pumping zone. In the first zone, the screw is usually designed to provide short period shearing via a narrow gap to ensure that all the components within the screw channel are captured and fused. However, because of certain factors such as the poor thermal conductivity of plastic and the tendency to enclose unfused component in the melt film, unmelted plastic often reaches the die. Designing the screw longer or rotating it slower may help to solve the above problems. But it usually results in either a decreased production rate or thermally deteriorated extrudates. The thermal degradation is because, in the conventional screw extruder, the only method of energy dissipation in the melt pool is by increasing the temperature of the pool, due mainly to excessive shearing of the melt pool.

Another problem with plasticizing screw extruders is the inadequate ability to control the uniformity of pumping zone pressure and to maintain an optimum high operating pressure in the pumping zone, particularly in the case of low viscosity plastics such as poly(ethylene terephthate) polymers.

In the single screw extruder, when solid polymer in the form of powder or pellets is fed into the extruder through the hopper, the polymer particles in the solids conveying zone are packed closely together to form a solid bed or plug which is conveyed down the helical channel. The output of an extruder can be limited by its ability to convey solids. If the pressure rise is insufficient, then as soon as melting starts, the channel becomes semi-filled, causing the pressure profile across the rest of the extruder to be lowered. This lower pressure at the discharge end of the extruder results in lower output and a possible pressure surge. The solids conveying zone is typically the length of the cooled portion of the hopper or approximately two screw diameters.

The delay zone is a transition between the solids conveying and the melting zone. The solid plastic plug rubs against the screw while on the barrel surface a thin melt film adheres via a viscous drag mechanism. The delay zone begins at the point where the temperature of the solid plug in contact with the barrel reaches the melting point of the polymer. A thin melt film is formed which cannot be scraped away by the advancing flight. The melt film continues to increase in thickness as the solid bed moves in the down channel direction. When the melt film reaches a thickness large enough that the advancing flight scrapes a portion of the polymer from the barrel, a melt pool is formed and the delay zone ends. The delay zone is usually approximately two to four screw diameters in length.

The melting zone begins at the point where the melt film formed on the surface of the barrel in the delay zone increases in thickness and reaches a steady state condition. Melting of the solid bed is caused by heat conduction from the barrel and viscous heat dissipation from the constant shearing of the thin melt film. At the start of the melting zone the advancing flight scrapes off a portion of the melt film forcing the melt to accumulate in a pool at the side of the solid bed. As melting continues, the melt pool increases, exerting a pressure on the solid bed, forcing it to continuously deform. This deformation forces new solids to contact the melt film on the barrel surface, replacing the newly melted plastic in the solid bed melt film interface. The solid bed is constantly forced toward the melt film along with its movement downstream.

A recent prior art approach intended to solve some of the problems encountered in operating single screw extruders is described in an article by Lloyd Kovacs in Plastics Technology, October 1970 on pages 19 and 51, more fully discussed hereafter. Briefly, the apparatus there disclosed incorporates the feature of draining melt as formed from the pushing side of the flights into a central bore containing a second screw for advancing the melt to the die.

It is an object of the present invention to provide a plasticizing screw extruder apparatus wherein melt is subjected to minimum shear and to minimum conditions for thermal degradation.

It is a further object to provide such an apparatus which can operate at high throughput with minimum or essentially no pressure and flow surges or fluctuations in the high pressure end of the extruder, even when operating with relatively low inherent viscosity plastic materials such as poly(ethylene terephthalate).

Other objects, features and aspects, as well as advantages, of the present invention will become apparent from a study of the following description and drawings.

According to one aspect of the present invention there is provided screw extruder apparatus for plasticizing thermoplastic material and issuing such material from an orifice comprising an elongated hollow barrel having an axial bore therein adapted to receive raw thermoplastic material from a source and containing an axially disposed, rotatable extruder screw for plasticizing, advancing and melting thermoplastic material, a passage communicating with the bore and connected to the orifice, the barrel having a low pressure end where raw thermoplastic material is received and a high pressure end from which plasticized melted material is delivered to said passage. The screw contains an elongated hollow internal axial cavity, bored through the end of the screw that is positioned in the high pressure end of the barrel and extending part way toward the low pressure end, seal means intermediate the ends of the hollow portion of the screw which prevents passage of plastic material across the seal means between said barrel and the screw, lateral passageways through the shaft of the screw, leading into said axial cavity from near the pushing side of the screw flights that are adjacent said axial cavity and are on the low pressure side of the seal means. The flights of the screw between said low pressure end and the seal means are pitched to advance plastic toward said seal and the flights of the screw that are on the high pressure side of the seal means are oppositely pitched to advance toward the seal means the material that issues through the end of the screw from the axial cavity. The passage connecting the barrel bore and the orifice is located in the sidewall of the barrel near the high pressure side of the seal means. Also a feature of the apparatus is the provision for independent temperature control of the plastic in the apparatus on the high pressure side of the seal means. An optional but desirable feature is the provision of a heat insulating means to minimize heat flow axially across said seal means.

In another aspect of the invention in a preferred embodiment of the foregoing apparatus there is provided means to vary the volume of melted plastic present in the extruder apparatus on the high pressure side of the seal means. In this aspect the means to vary such volume is advantageously connected operatively to means responsive to the pressure in the high pressure end of the barrel so as to vary automatically such volume so as to maintain this pressure essentially at a desired constant value.

FIG. 1 shows in partial cross-section a screw extruder of the invention with associated controls for varying the volume of plastic in the high pressure end of the extruder.

FIG. 2 illustrates a modification of FIG. 1 without the means for varying the volume of plastic in the high pressure end of the extruder.

The invention is described in more detail in connection with the following description of the drawings.

The plasticizing screw extruder of FIG. 1 has barrel 2 containing screw 4 which terminates in shaft 6 which is coupled to drive means, not shown. Hopper 8 is provided for introduction of powdered or granular or pelleted plastic into barrel 2. The extruder can be viewed as being divided into three functional sections (which overlap to some degree), namely, solids conveying and delay zone 10, melting and conveying zone 12 and homogenizing and pumping zone 14. The portion of the screw for the solid conveying and delay zones 10 can be of a conventional design but the portion of the screw for the melting and conveying zone 12 and the homogenization and pumping zone 14 are specially designed such that the melted plastic in the screw channel is continuously drained as formed into the center bore 16 of the screw. Drainage is through lateral or radial passageways 18 through the shaft or core 20 of the screw 4. Only one hole is shown for each flight but there may be several. Integral seal ring 24 can optionally contain ceramic or other heat insulation 26 as a barrier to heat transfer across seal 24. Screw flights 28 are pitched in the opposite direction of the other screw flights, in a direction to push toward seal means 24. Piston 30 in barrel 2 is connected by a shaft to hydraulic drive piston 34 in cylinder 36 containing hydraulic fluid. Reservoir tank 38 contains hydraulic fluid which can be conveyed via line 40, pump 42, line 44 and motor valve 46 to cylinder 36. Line 48 containing motor valve 50 connects cylinder 36 with tank 38. Line 52 containing motor valve 54 connects line 44 with tank 38. Pressure controller 56 senses the pressure in cylinder 36 (and thus pressure in barrel 2 near the outlet of bore 16) and can be set to hold a desired pressure.

In operation, plastic material usually in the form of paticulate solids is introduced through hopper 8 and is moved toward the opposite end of barrel 2 by rotating screw 4, driven by power means not shown. In zone 10 the particles are packed closely together to form a solid bed or plug which is conveyed down the helical screw channel. In the latter part of zone 10 the solid plug begins to melt as it rubs against the screw and near the barrel surface is heated by conventional resistance heaters 15. Further downstream enough melted plastic begins to form to accumulate at the pushing face of the flights, but when zone 12 is reached this melt and further melt drains as formed through holes 18 into bore 16 and by the time the plastic in the helical screw channel reaches seal 24 it is all or nearly all melted and passes as a liquid into bore 16. It is an advantage of the present apparatus, however, that it can be operated at a rate high enough that some small solid particles occluded in the liquid can pass through holes 18 without concern that solid particles might reach outlet passages 57 and die 58, because of the relatively large residence time for melting in zone 14. The melt passes through the bore 16 into zone 14 and issues from bore 16 and is pumped back toward seal 24 by reverse helix 28 and issues from passage 57 and die 58, which can be of any desired shape. The temperature of the melt in zone 14 is independently controlled by heaters 60 or by cooling coils 62. If the pressure in the barrel in zone 14 is the desired pressure for which pressure controller 56 is set, valves 46 and 50 remain closed, while valve 52 is open to allow circulation of fluid through the pump to tank 38. If for any reason the pressure in barrel 2 in zone 14 drops significantly pressure controller 56 causes valve 54 to close and valve 46 to open so that hydraulic fluid is pumped into cylinder 36 until the desired pressure is restored, at which time valve 46 closes and valve 54 opens. If for any reason a significant upward surge in pressure in barrel 2 in zone 14 occurs, pressure controller 56 causes valve 50 to open and hydraulic fluid from 36 drains into 38 until the desired pressure is restored, at which time valve 50 again closes.

The embodiment of the present invention shown in FIG. 2 is exactly the same as that of FIG. 1 except that no provision is made for piston 30 and the variable volume at the end of the barrel 2.

In the embodiment of FIG. 1 a piston in barrel 2 is used to vary the volume of plastic in zone 14. This is a most practicable means; however, any other suitable means can be employed. For instance, the space at the end of barrel 2 can be occupied by a diaphragm that can vary the effective volume of melt in zone 14. On the side of the diaphragm opposite the melt side can be hydraulic fluid whose volume is varied in response to variations in the pressure thereof.

The concept of draining melt into a central bore of the screw shaft has been disclosed and some of the advantages thereof discussed in the Kovacs article to which reference has been made. In the extruder there described the melt is pumped by a second screw in the bore to a terminal die attached to the end of the barrel.

While the scheme in the article decreases the shear to which the melt is subjected compared to a conventional single screw extruder, my apparatus has several important advantages thereover. First, the melt in the inner bore of Kovacs is subject to nearly the high temperatures of the surrounding screw channel while in my apparatus the melt in the axial cavity or bore 16 of the screw located in zone 14 has its temperature controlled independently. Thus, cooling coils 62 can be used to adjust the temperature in both the screw channel and the internal cavity in zone 14 to a lower value than in zone 12. In this way thermal decomposition of heat sensitive plastics can be held to a minimum; also, the temperature can be adjusted for extrusion at a desired temperature, for instance, the melt can be conditioned to a temperature conducive to strengthening by stretch orientation.

Another advantage is that the melt after it drains into bore 16 occupies a much larger proportionate volume. This allows a longer time for the melting of isolated particles of unmelted occlusions and therefore the drain holes 18 of my apparatus can be larger than in Kovacs.

Another important advantage of this larger melt volume in residence in the extruder apparatus is that, even in the embodiment of FIG. 2, pressure surges are minimized and the plastic is fed to the die at a much more uniform pressure under potential surge conditions. Of course, in the embodiment of FIG. 1 pressure is positively controlled so that pressure fluctuations in zone 14 and at the die are essentialy eliminated. Moreover, in the apparatus shown in the Kovacs publication high pumping pressure cannot be achieved by high revolution of the screw because the high pumping pressure could be achieved only by loading the screw channels with solids. But pressure and flow surging is caused by loading an extruder with solids by suddenly plugging the apparatus with solids, resulting in a sudden drop in fluid pressure downstream, with concomitant sudden reduced delivery of melt to the die. Then when continued melting finally unplugs the apparatus, a sudden pressure and flow surge also occurs. High uniform pumping pressure is particularly not achievable with polymers of low inherent viscosity such as poly(ethylene terephthalate) and with such polymers pressure control becomes increasingly difficult at a high revolution of the screw. On the other hand the present apparatus has no such limitations because of the means by which pressure fluctuations are essentially eliminated.

The present apparatus also has the advantage that gas can be vented from barrel 2 between piston 30 and the end of extruder 4 by providing a suitable vent port from the barrel.

As will be evident to those skilled in the art, various modifications of this invention can be made or followed in the light of the foregoing disclosure and discussion without departing from the spirit and scope of the disclosure or from the scope of the claims.

I claim:

1. Screw extruder apparatus for plasticizing thermoplastic material and issuing said material from an orifice comprising an elongated hollow barrel having an axial bore therein adapted to receive raw thermoplastic material from a source thereof and containing an axially disposed, rotatable extruder screw for plasticizing, advancing and melting thermoplastic material, a passage communicating with said bore and operatively connecting an exit orifice with said bore, said barrel having a low pressure end where raw thermoplastic material is received and a high pressure end from which plasticized melted material is delivered to said passage, said screw containing an elongated hollow internal axial cavity, bored through the end of the screw that is positioned in the high pressure end of said barrel and extending part way toward said low pressure end, seal means intermediate the ends of the hollow portion of the screw which prevents passage of plastic material across said seal means between said barrel and said screw, lateral passageways through the shaft of said screw, leading into said axial cavity from near the pushing side of the flights of said screw that are adjacent said axial cavity and are on the low pressure side of said seal means, the flights of said screw between said low pressure end and said seal means being pitched to advance plastic toward said seal and the flights of said screw that are on the high pressure side of said seal means being oppositely pitched to advance toward said seal means the material that issues through the end of the screw from said cavity, said passage connecting said bore and said orifice being located in the sidewall of said barrel near the high pressure side of said seal means.

2. Apparatus of claim 1 wherein said seal means contains insulating means to at least partially thermally insulate heat flow across said seal means in an axial direction.

3. Apparatus of claim 1 wherein means is provided to vary the volume of melted plastic present in said extruder apparatus on the high pressure side of said seal means.

4. Apparatus of 3 wherein said means to vary the volume is a piston in the high pressure end of said barrel axially movable to increase or decrease said volume in the high pressure end of said barrel.

5. Apparatus of claim 3 wherein said means to vary said volume is operatively connected to means responsive to the pressure in said high pressure end of said barrel so as to vary automatically said volume so as to maintain said pressure essentially at a desired constant value.

6. Apparatus of claim 5 wherein said means to vary said volume is an axially movable piston in the high pressure end of said barrel.

7. Apparatus of claim 1 including means to control the temperature of the plastic in said extruder on the high pressure side of said seal means independently of temperature of the plastic on the other side of said seal means.

8. Apparatus of claim 7 wherein said seal means contains insulating means to at least partially thermally insulate heat flow across said seal means in an axial direction.

9. Apparatus of claim 7 wherein means is provided to vary the volume of melted plastic present in said extruder apparatus on the high pressure side of said seal means.

10. Apparatus of claim 9 wherein said means to vary said volume is operatively connected to means responsive to the pressure in said high pressure end of said barrel so as to vary automatically said volume so as to maintain said pressure essentially at a desired constant value.

* * * * *